May 24, 1932.  C. H. W. NASON  1,859,597

ELECTROOPTICAL APPARATUS AND METHOD

Filed Jan. 3, 1930

CHARLES H. W. NASON

INVENTOR

BY Darby & Darby his ATTORNEYS

Patented May 24, 1932

1,859,597

UNITED STATES PATENT OFFICE

CHARLES H. W. NASON, OF NEW YORK, N. Y., ASSIGNOR TO JENKINS TELEVISION CORPORATION, OF JERSEY CITY, NEW JERSEY, A CORPORATION OF DELAWARE

ELECTROOPTICAL APPARATUS AND METHOD

Application filed January 3, 1930. Serial No. 418,205.

This invention relates to electrooptical systems and with particularity to scanning methods and means.

An object of the invention is to provide an improved method and apparatus for scanning an object or other visual representation.

Another object is to provide apparatus for scanning a continuously moving representation such as a motion picture film.

A feature of the invention relates to the means for scanning a continuously moving web or similar visual representation in a direction transverse to the web movement, together with means for compensating for the longitudinal movement of the web.

Another feature relates to an adjustable mechanism for scanning a continuously moving film, band or web in successive linear elements which are substantially perpendicular to the longitudinal movement of the web or band.

Other features and advantages of the invention not specifically enumerated will be apparent after a consideration of the following detail descriptions and the appended claims.

While the invention will be disclosed hereinafter as applied to one specific type of scanning mechanism, namely a disc type scanner, it will be understood that the invention is not limited thereto but may be embodied in other forms of scanners with equally good results.

Accordingly Fig. 1 of the drawing shows in schematic form a front view of the scanning mechanism according to the invention;

Figure 1:
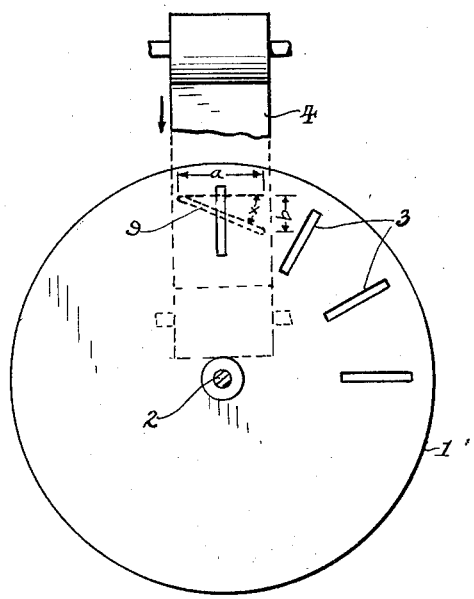
Figure 2:
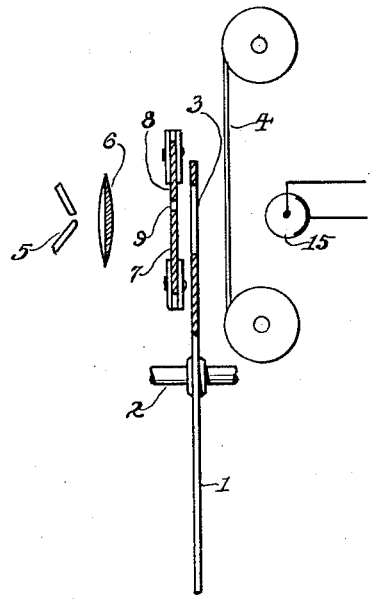
Fig. 2 shows a schematic view partly in section of the scanning mechanism according to the invention.
Figure 3:
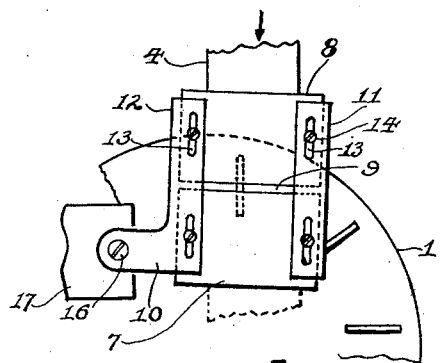
Fig. 3 is a detail view of an adjustable aperture plate that may be employed for carrying out the invention.

Referring more particularly to Figs. 1 and 2 the numeral 1 represents a scanning member in the form of a disc, preferably, but not necessarily, of a light metal such as aluminum or the like. Disc 1 is mounted on a shaft 2 which is adapted to be driven at the proper angular speed by any suitable motive source (not shown). Disc 1 is provided with a series of light transmitting openings or scanning elements 3 which are preferably in the form of narrow slots having a width corresponding to the size of the elemental areas into which the subject, object or visual representation is to be subdivided. Each opening 3 is adapted to function in scanning a separate linear element of the object or representation which is indicated in the drawing as a motion picture film 4. For example, assuming that the film 4 is to be scanned in 48 successive linear elements extending transversely across the width of the film, then the disc 1 is provided with 48 scanning elements 3. Positioned on one side of the disc 1 and opposite to the film 4 is a source of light 5, preferably of high and constant intensity such as an arc lamp or the like. The light from source 5 is projected by a suitable optical system 6 upon a light baffle comprising the vertically adjustable plates 7 and 8 which define a light transmitting slot 9 between their adjacent edges. The plates 7 and 8 are so mounted that the slot 9 extends transversely with relation to the film 4. As shown more in detail in Fig. 3 the plates 7 and 8 are mounted for sliding motion in a frame 10 which is provided with suitable guides 11 and 12. By means of the slots 13 in the frame 10 and the bolts 14 the plates 7 and 8 may be locked in their properly adjusted position to provide the requisite width of light slot 9. It is obvious therefore that as the disc 1 rotates in front of the slot 9 that the light from source 5 is projected upon the film 4 in the form of a spot which traverses the said film in successive linear elements. The size of this spot being determined by the separation of the plates 7 and 8 and the width of the scanning slots 3. The light which thus passes through the film 4 is received by a suitable light sensitive device 15 and may be amplified preparatory to transmission in any well known manner.

When the visual representation to be scanned is a motion picture film 4, it has been found desirable for various reasons, to advance said film in a continuous uniform motion past the scanning apparatus. Assuming, therefore that the film 4 (Fig. 2) is being thus advanced at a uniform speed, and also assuming that the frame 10 is adjusted so that slot 9 is perpendicular to the direction of motion of the film, the said film will be scanned in successive linear elements which are at an angle to the direction of motion of the film. Consequently when the image of the film is reproduced by any well known television or picture transmission apparatus there will appear a distortion.

In order to overcome this distortion and to enable the film 4 to be scanned in successive linear elements which extend perpendicularly to the length of the film, the frame 10 is pivotally mounted as indicated by the numeral 16 on a suitable bracket 17 whereby the slot 9 may be positioned at any desired angle with relation to the direction of movement of the film. The particular angle indicated as X in Fig. 1 will, of course, be demined by the distance the film 4 moves while scanning element 3 is moving from one end of the slot 9 to the other. For example, if the film 4 advances in the direction of the arrow a distance $b$ while a slot 3 moves across the film, then the member 10 is adjusted to an angle whose sine is $b/a$, as indicated by the dotted position of the slide 9 in Fig. 1.

Figure 4:
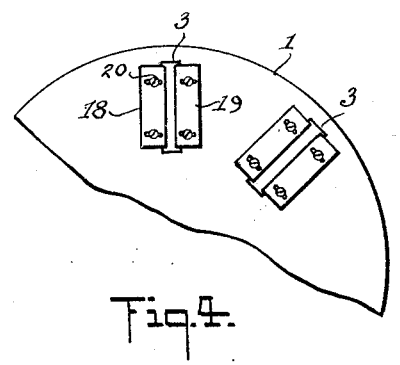
Fig. 4 shows a modified form of scanning device according to the invention having adjustable scanning openings therein.

There is shown in Fig. 4 a scanning disc similar to the disc 1 of Fig. 1 and having means for controlling the width of each of the slots 3. As shown in Fig. 4 each slot 3 is provided with a pair of adjustable non-transparent strips 18 and 19 which may be moved towards and away from each other to regulate the opening therebetween, each strip being provided with suitable means such as the locking bolts 20 for locking the strips in their proper positions. While a pair of plates are shown in Fig. 4 associated with each slot 3, it will be understood that the effective width of the slots may be controlled by a single plate which may be moved, adjustably regulating the width of the light transmitting opening through the slot. Other ways of adjusting the slot width may occur to those familiar with the art.

While the compensation for the continuous motion of the film 4 is effected by changing the angular position of the slot 9, it will be understood that this compensation may be effected in any other equivalent manner. For example, a band of light of the proper width may be projected by any other arrangement upon the face of the disc 1 and this band may be inclined to compensate for the motion of the film in any equivalent manner to that above described.

Likewise, instead of employing light transmitting slots or openings in the member 1, the film or other object may be scanned by a reflected light beam in which case the member 1 will be provided with suitable reflecting elements such as mirrors, in place of the elements 3.

Similarly, the scanning device may take the form of a drum instead of a disc, and other modifications will be apparent to those familiar with the art.

What is claimed is:

1. In an image transmission system means for scanning a film continuously in one direction, means for scanning said film in successive lines perpendicular to the length of the film, comprising a stationary light slit, means for illuminating said light slit, and means for adjusting the angle of said slit with relation to said film in accordance with the speed of movement of said film.

2. In combination a rotatable scanning device having a plurality of separate scanning elements, a stationary scanning light slit and means for adjusting the angular position of said light slit with relation to said scanning elements in accordance with the speed of said film.

3. Scanning mechanism for scanning a continuously moving film comprising a rotatable member having a plurality of separate light slits, a stationary light slit intersecting the first mentioned slits when said member is rotated, and means for varying the angle of intersection between the stationary slit and the movable slits for scanning a continuously moving film.

4. In combination a continuously moving film, a rotatable disc having a plurality of separate scanning slots each adapted to scan a different transverse strip of said film, and means for causing said disc to scan said film in strips perpendicular to the direction of movement of said film, including an angularly adjustable light baffle having a light slit therein, and means for locking said baffle in adjusted position.

5. A scanning device having a plurality of scanning openings, and means associated with each opening for varying the effective scanning area thereof to any desired size between zero and maximum independently of the remaining openings.

6. A scanning device having a plurality of scanning openings and an adjustable closure member associated with each opening for varying the effective scanning area of each opening independently of the remaining openings, said closure member being adapted to vary the size of the associated opening to any desired value between zero and maximum.

7. A scanning device having a plurality of light slits and means for adjustably varying the width of each slit to any desired size between zero and maximum, and independently of the remaining slits.

8. In an image transmission system the combination of a source of light, a continuously moving film, a light baffle having a slit therein extending transversely across the width of said film, a disc adapted to rotate in a plane parallel to said film, said disc having a plurality of light slits one for each linear element of the film to be scanned, means for mounting said baffle so that the light slit therein intersects the slits in said disc when the latter rotates, and means for varying the angular position of the light slit in the baffle in accordance with the speed of movement of the film.

9. The combination according to claim 8 in which means are provided for varying the width of the light slit in the baffle.

10. The combination according to claim 8 in which means are provided for separately varying the width of each slit in the disc and for varying the width of the slit in the baffle.

11. A scanning device comprising a rotatable member having a series of light slits, and a closure member for each slit, each closure member being attached to the rotatable member to vary the effective area of each slit to any film between zero and maximum.

12. A scanning device comprising a rotatable member having a series of light slits therein, a closure member for each slit, means for mounting each closure member on the rotatable member for adjustment adjacent the associated slit, and means for locking each closure member in adjusted position.

13. A scanning device in the form of a rotatable member having a plurality of separate light slits therein, means for varying the effective width of each slit comprising a pair of plates for each slit adjustably fastened to the rotatable member.

In testimony whereof I have hereunto set my hand on this 27th day of December A. D., 1929.

CHARLES H. W. NASON.